No. 892,587.
PATENTED JULY 7, 1908.
H. E. GALBRAITH.
PEANUT HARVESTER.
APPLICATION FILED JULY 9, 1907.
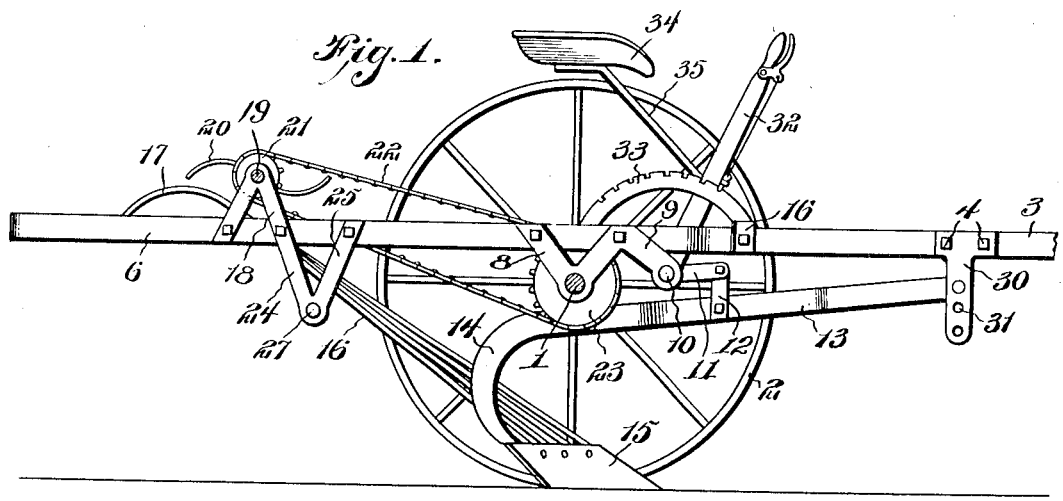
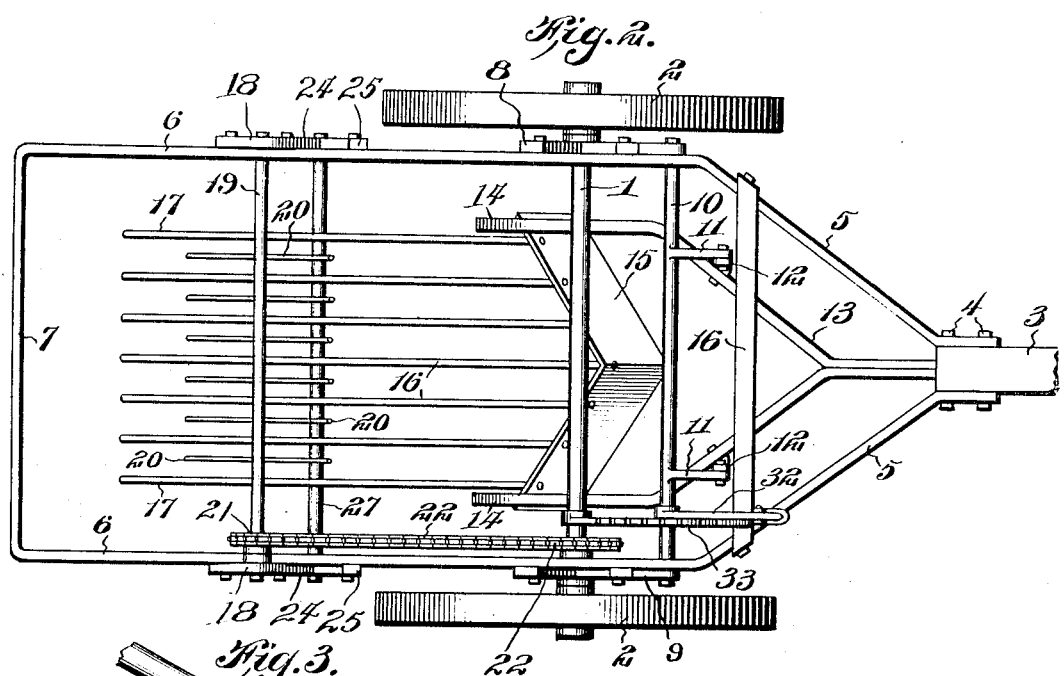
Inventor
Homer Elzie Galbraith
Witnesses
Louis R. Heinrichs
By Victor J. Evans
Attorney

UNITED STATES PATENT OFFICE.

HOMER ELZIE GALBRAITH, OF MANGUM, OKLAHOMA.

PEANUT-HARVESTER.

No. 892,587.   Specification of Letters Patent.   Patented July 7, 1908.

Application filed July 9, 1907. Serial No. 382,948.

*To all whom it may concern:*

Be it known that I, HOMER ELZIE GALBRAITH, a citizen of the United States, residing at Mangum, in the county of Greer, Oklahoma, have invented new and useful Improvements in Peanut-Harvesters, of which the following is a specification.

This invention relates to machines for harvesting peanuts, and one of the principal objects of the same is to provide a simple and efficient machine for digging the peanuts and vines and for shaking the soil off the vines and nuts and depositing them on the ground in rear of the machine.

Another object of my invention is to provide a machine of simple construction in which the plow or digger can be raised or lowered without interfering with the action of the screening device for shaking the soil off the vines and peanuts.

These and other objects may be attained by means of the construction illustrated in the accompanying drawings, in which:

Figure 1 is a side elevation of a machine made in accordance with my invention, the axle being shown in section and one wheel being removed. Fig. 2 is a plan view of the same. Fig. 3 is a detail and partial section of the supporting bar for the screen rods, and showing the manner of connecting the screen rods to said bar.

Referring to the drawings for a more particular description of my invention, the numeral 1 designates the axle, and 2 are the wheels journaled thereon. The draft tongue 3 is secured at its rear end to a frame formed by a metal bar, the ends of which are bolted by a metal bar, the ends of which are bolted as at 4, through the tongue, and diverge, as at 5, and extend backwardly to form parallel side portions 6 connected in the rear by a cross bar 7. This frame is connected to the axle 1 by means of brackets 8 bolted to the frame, said axle being mounted to rotate in said brackets. Extending forwardly and downwardly from the bracket 8 on each side of the frame is an arm 9, and journaled in these arms is a rock shaft 10 provided with forwardly extending arms 11 which are connected by links 12 to the plow beam 13, said plow beam comprising two oppositely diverging members having downwardly curved rear ends 14 to which the plow 15 is secured at the opposite sides thereof. A cross brace 16 extends from one of the diverging members 5 of the frame to the other. Secured to the upper edge of the plow 15 are a series of inclined rods 16 which extend up above the frame and are downwardly curved, as at 17, at their rear ends. A bracket 18, secured to the side bars 6 and extending above the same, provides bearings for a shaft 19 carrying a series of oppositely curved fingers 20, said fingers being disposed between the rods 16.

A sprocket wheel 21 on the shaft 19, is connected by means of a drive chain 22 with a sprocket 23 on the axle 1. Extending downwardly from the bracket 18 is an arm 24 provided with an upwardly extending member 25 secured to the side bars 6, and mounted in the lower end of the arm 24 is a shaft 27 provided with a series of studs 28 which engage, each in a socket 29 extending downwardly from each of the rods 16. The front ends of the beam members 13 are connected to a depending clevis 30 provided with perforations 31 for adjusting the front ends of said beam members to regulate the penetration of the plow 15. A lever 32 provided with a sector rack 33 is secured to the shaft 10 for raising and lowering the plow 15. A seat 34 is mounted on a bracket 35 secured to the frame.

The operation of my invention may be briefly described as follows: The machine is drawn over the field and the plow 15 runs under the vines and carries the vines and connected peanuts up upon the rods 16, the soil being shaken from the vines and nuts as they pass upward. The fingers 20 on the shaft 19 are rotated between the rods to carry the vines and peanuts up and over the curved portion 17 of the rods 16 to drop the clean nuts and vines at the back of the machine and in front of the cross bar 7. When the plow 15 is raised or lowered, the studs 23 will move in the sockets 29 and thus permit the adjustment of the plow without interfering with the rods 16.

From the foregoing it will be obvious that a machine made in accordance with my invention is of comparatively simple construction, will operate efficiently for its purpose; will permit the adjustment of the plow without interfering with the screening rods. The machine is comparatively light and strong, and cannot readily get out of order.

Having thus described the invention, what I claim is:

1. In a machine of the character described, the combination of a plow, means for raising and lowering said plow, a series of screening rods secured to said plow, said rods each having a socket formed therein, in combination with a supporting rod having studs formed thereon to engage said sockets.

In testimony whereof, I affix my signature in presence of two witnesses.

HOMER ELZIE GALBRAITH.

Witnesses:
 JNO. R. DANIEL,
 J. A. SIMMONS.